US007218065B2

(12) United States Patent
Muramatsu

(10) Patent No.: US 7,218,065 B2
(45) Date of Patent: May 15, 2007

(54) DISCHARGE LAMP LIGHTING CIRCUIT

(75) Inventor: Takao Muramatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/371,719

(22) Filed: Mar. 8, 2006

(65) Prior Publication Data

US 2006/0232223 A1 Oct. 19, 2006

(30) Foreign Application Priority Data

Mar. 10, 2005 (JP) .......................... P.2005-067203

(51) Int. Cl.
*G05B 1/00* (2006.01)

(52) U.S. Cl. ...................... 315/291; 315/307; 315/276; 315/279; 315/209 R

(58) Field of Classification Search ................ 315/291, 315/307, 224, 274, 276, 279, 287
See application file for complete search history.

(56) References Cited

U.S. PATENT DOCUMENTS

2005/0062443 A1* 3/2005 Ohta et al. .................. 315/308

FOREIGN PATENT DOCUMENTS

JP 7-142182 6/1995

* cited by examiner

*Primary Examiner*—Tuyet Thi Vo
(74) *Attorney, Agent, or Firm*—Fish & Richardson P.C.

(57) ABSTRACT

A control section is used to control a DC-to-AC converter circuit to perform lighting control of a discharge lamp. A transformer, switching elements, and a capacitor for resonance are included. The switching elements are driven and serial resonance of the capacitor and the inductance component of the transformer or an inductance element is produced. Before the discharge lamp is turned on, control is performed to cause the driving frequency of the switching elements to gradually approach Foff and to supply a start signal to the discharge lamp. Once the discharge lamp is turned on, control is performed to continuously change the driving frequency from f1 assumed before the discharge lamp is turned on to f2. A residence time in a frequency range lower than Fon is secured then the frequency is shifted to a frequency range fb higher than Fon, or an inductive range fb.

20 Claims, 11 Drawing Sheets

DISCHARGE LAMP LIGHTING CIRCUIT

CROSS-REFERENCE TO RELATED APPLICATIONS

This application is based upon and claims the benefit of priority from the prior Japanese Patent Applications No. 2005-067203, filed on Mar. 10, 2005, the entire contents of which are incorporated herein by reference.

BACKGROUND OF THE INVENTION

1. Field of the Invention

The present invention relates to a technique for reliably shifting to a stable lighting state after a discharge lamp is turned on in a discharge lamp lighting circuit suited for compact design and supporting high-frequencies.

2. Description of the Related Art

There is known a lighting circuit for a discharge lamp such as a metal halide lamp having a DC power supply circuit designed as a DC-to-DC converter, a DC-to-AC converter circuit, and a starter circuit. For example, an input DC voltage from a battery is converted to a desired voltage in the DC power supply circuit and then converted to an AC output in the DC-to-AC converter circuit downstream of the DC power supply circuit, and the output is overlaid with a starting signal. The resulting signal is supplied to a discharge lamp (For example, refer to JP-A-7-142182).

In the process of lighting control of a discharge lamp, an open-circuit voltage (hereinafter referred to as OCV) before the discharge lamp is lit (when the discharge lamp is turned off) is controlled to apply a start signal to the discharge lamp thereby lighting the discharge lamp and lowering a transient input voltage to place the discharge lamp in the steady lighting state.

The DC power supply circuit comprises for example a switching regulator that uses a transformer. The DC-to-AC converter circuit comprises, for example, a full bridge type design using multiple pairs of switching elements.

JP-A-7-142182 is referred to as a related art.

A related art lighting circuit requires a transformer used in a DC power supply circuit and a transformer that constitutes a starting circuit. Further, the larger the number of switching elements used in a DC-to-AC converter circuit becomes, the more problems arise with the circuit scale and the system cost. For example, in case a discharge lamp is used as a light source for an automobile lamp, it is necessary to arrange a lighting circuit in a limited space (such as a case where a lighting circuit unit is housed in a lighting fixture).

In a configuration where voltage conversion is performed at two stages (DC voltage conversion and DC-TO-AC voltage conversion), the circuit scale could be increased, which compromises a compact design. In order to offset this drawback, a configuration is possible where an output boosted by single-stage voltage conversion in a DC-to-AC converter circuit is supplied to a discharge lamp. For example, a configuration is possible where a single transformer and a resonance circuit are used to boost a resonance voltage and the resulting power is supplied to a discharge lamp. What counts in such a case is how the discharge lamp is reliably and quickly placed in a stable lighting state after it is started. This need is mandatory for safety in nighttime operation in an application of a light source for an automobile lamp. In particular, in a case where a discharge lamp is to be lit when it is cold (so-called "cold start"), an excessive input power exceeding a rated power is supplied to the discharge lamp. It is necessary to provide countermeasures against a possible rise in the probability of a blown lamp taking place in case discharge is interrupted when the discharge lamp is no longer lit during transient power control.

SUMMARY OF THE INVENTION

One or more embodiments of the invention keep a discharge lamp lit after it is started and reliably place the discharge lamp into a stable lighting state.

One or more embodiments of the invention provide a discharge lamp lighting circuit having a DC-to-AC converter circuit which receives an input DC voltage to perform DC-to-AC conversion, a starting circuit which supplies a start signal to a discharge lamp, and a control section which controls power output from the DC-to-AC converter circuit, wherein the discharge lamp lighting circuit has the following configuration.

The DC-to-AC converter circuit includes a plurality of switching elements driven by the control section, and a serial resonance circuit including an inductance element or a transformer and a capacitor.

Where a resonance frequency of the serial resonance circuit assumed when the discharge lamp is turned off is represented as "Foff", a driving frequency of the switching elements assumed immediately before the discharge lamp is turned on is represented as "f1", the resonance frequency of the serial resonance circuit assumed when the discharge lamp is turned on is represented as "Fon", and the driving frequency of the switching elements assumed when the discharge lamp is turned on is represented as "f2", a driving control of the switching elements is performed so that the driving frequency gradually approaches Foff and the start signal is supplied to the discharge lamp before the discharge lamp is turned on.

After the initiating the discharge lamp to be turned on, the frequency is continuously shifted from f1 to f2 so that the driving frequency of the switching elements is shifted to a frequency range higher than Fon.

According to embodiments of the invention, the frequency is not changed from f1 to f2 immediately after the discharge lamp is initiated to be turned on by way of the start signal. Rather, shift control from f1 to f2 is continuously performed to gradually change the driving frequency. That is, control is performed so that a residence time in a frequency range lower than the resonance frequency (capacitive range or advanced-phase range) when the discharge lamp is turned on is secured and a shift is performed to a frequency range higher than Fon when the electrode of the discharge lamp is warmed up.

According to embodiments of the invention, it is possible to reliably keep lighting a discharge lamp after it is started, thereby substantially reducing the probability of unstable lighting or blackout. This approach does not involve a complicated circuit configuration or a complicated control method, which is advantageous in terms of a compact design and lower cost of a circuit device.

It is desirable that a frequency "fw" is set between f1 and f2 and control is performed to change the variation speed of a driving frequency from f1 to fw after the discharge lamp is lit from the variation speed of the driving frequency from fw to f2 after fw is reached in order to reduce the time from a time point the discharge lamp is started and lit to a stable lighting state. For example, assuming that the relationship "f1<fw<Fon" is held between F1, fw and Fon, in the case where the variation speed of the driving frequency changing from f1 to fw is represented as "$\Delta f1w/\Delta t$", the variation speed of the driving frequency changing from fw to f2 is represented as "Δfw2/Δt", and the magnitude of the variation speeds are represented using an absolute value sign "| |", the relationship "|Δf1w/Δt|>|Δfw2/Δt|" is held. By way of power control in the range less than Fon (the range where the circuit output impedance when the discharge lamp is on is capacitive), it is possible to shift the driving frequency to a frequency range higher than the resonance frequency Fon (inductive range or delayed-phase range) with the electrode of the discharge lamp warmed up. Thus, for example, it is possible to enhance the reliability of lighting at the cold start of a discharge lamp.

Setting the time period required for a shift from f1 to f2 to 10 milliseconds or more and one second or less is effective for prevention of flickering. The magnitude of the variation speed of the driving frequency is controlled to become smaller as the driving frequency approaches f2, which secures a sufficient residence time near Fon. This alleviates the temporal change in the lamp current and amount of light. For example, this contributes to the safety in nighttime operation in an application to a lighting fixture for a vehicle.

In order to simplify the control design, it is preferable to use a time constant circuit for changing the driving frequency of a switching element from f1 to f2. For example, it is possible to readily specify the variation speed of the driving frequency in accordance with switching between time constants or setting a time constant, without a complicated circuit design.

DETAILED DESCRIPTION OF THE PREFERRED EMBODIMENTS

Figure 1:
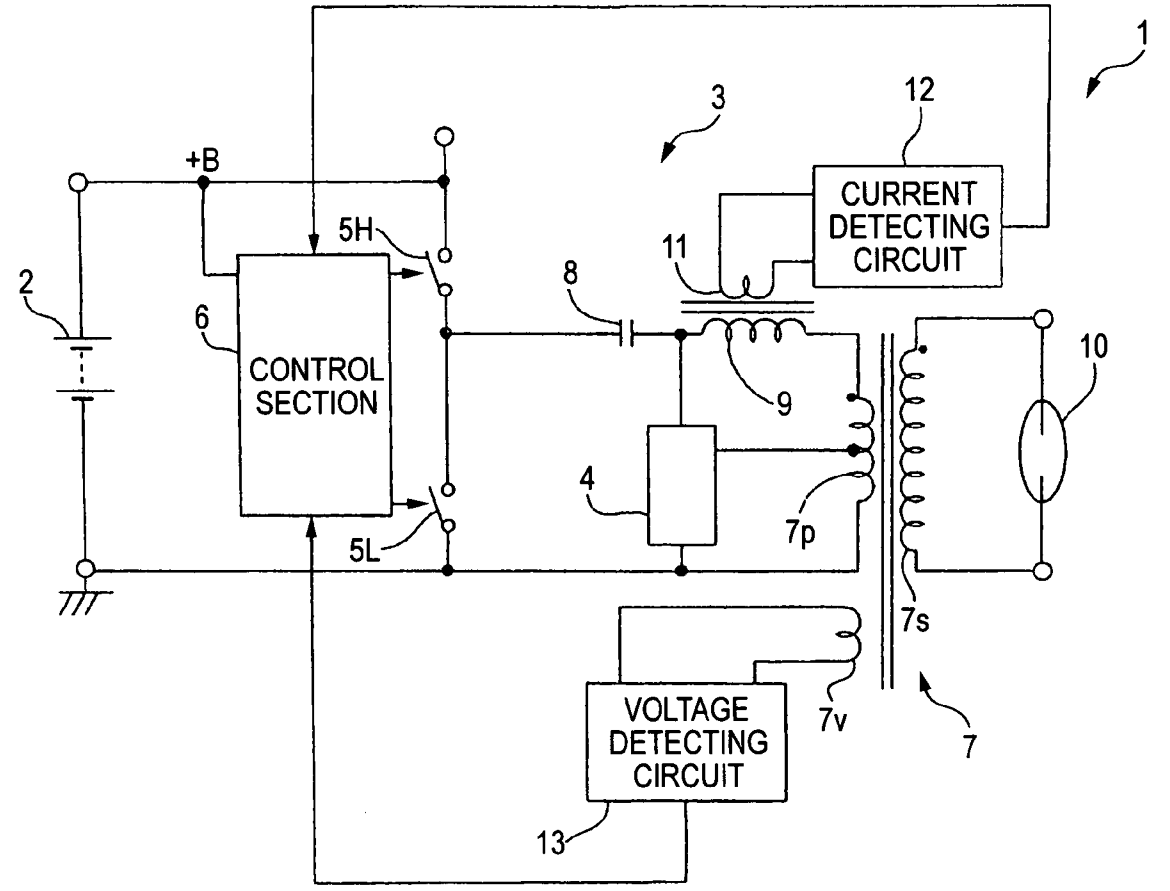
FIG. 1 shows a basic configuration example according to an embodiment of the invention.

FIG. 1 shows a basic configuration example according to an embodiment of the invention. A discharge lamp lighting circuit 1 comprises a DC-to-AC converter circuit 3 and a starting circuit 4 to which power is supplied from a DC power supply circuit 2.

The DC-to-AC converter circuit 3 is provided to receive an input DC voltage (see "+B" in FIG. 3) from the DC power supply circuit 2 and convert the DC voltage to an AC voltage and boosting the resulting voltage. In this example, two switching elements 5H, 5L and a control section 6 for making drive control of the switching elements are provided. One end of the higher-stage switching element 5H is connected to the power supply terminal while the other end of the switching element is grounded via a lower-stage switching element 5L so that the elements 5H, 5L are alternatively turned on/off. While the elements 5H, 5L are shown by a switch signs for clarity in FIG. 1, a semiconductor switch such as a field-effect transistor (FET) or a bipolar transistor may be used in reality.

The DC-to-AC converter circuit 3 has a power conversion transformer 7. In this example, on the primary side of the power conversion transformer 7 is used a capacitor 8 for resonance and a circuit configuration using a resonance phenomenon with an inductor or an inductance component. That is, three types of exemplary configuration may be used.

(I) Configuration using resonance between the capacitor 8 for resonance and an inductance element;

(II) Configuration using resonance between the capacitor 8 for resonance and the linkage inductance of the transformer 7; and (III) Configuration using resonance between the capacitor 8 for resonance, an inductance element and the linkage inductance of the transformer 7

In the configuration (I), an inductance element 9 such as a resonance coil is added and, for example, one end of the element is connected to the capacitor 8 for resonance and the capacitor 8 is connected to the junction between the switching elements 5H and 5L. The other end of the inductance element is connected to the primary winding 7*p* of the transformer 7.

In the configuration (II), an additional resonance coil is not required because the inductance component of the transformer 7 is used. What is required is to connect one end of the capacitor 8 for resonance to the junction between the switching elements 5H and 5L and connect the other end of the inductance element to the primary winding 7*p* of the transformer 7.

In the configuration (III), serial synthesis reactance of the inductance element 9 and a leakage inductance may be used.

In any configuration, using serial resonance between the capacitor 8 for resonance and an inductive element (inductance component or inductance element) and specifying the driving frequency of the switching element 5H, 5L to a value higher than the serial resonance frequency to alternatively turn on/off the switching element allows sign wave lighting of a discharge lamp 10 (such as a metal halide lamp used as a lighting fixture for a vehicle) connected to the secondary winding 7*s* of the transformer 7. In the driving control of each switching element by the control section 6, it is necessary to drive each switching element in an opposed fashion to prevent both switching elements from being turned on at the same time (by way of on-duty control or the like). For the serial resonance frequency, when the resonance frequency before lighting is represented as "Foff", the resonance frequency in lighting state as "Fon", the capacitance of the capacitor 8 for resonance as "Cr", the inductance of the inductance element 9 as "Lr", and the primary side inductance of the transformer 7 as "Lp1", in the configuration (III), for example, the relationship "Foff=1/(2·π·√(Cr·(Lr+Lp1)" is held before the discharge lamp is lit. For example, when the driving frequency is lower than Foff, the loss of the switching element is larger and the efficiency is lowered. Thus, switching operation is performed in a frequency range higher than Foff. When the discharge lamp is lit, the relationship "Fon≈1/(2·π·√(Cr·Lr))" is held. In this case also, switching operation is performed in a frequency range higher than Foff.

It is preferable that, after the lighting circuit is powered, OCV is controlled using a frequency value close to Foff in the turned-off state (open circuit state) of the discharge lamp and that lighting control is performed in a frequency range higher than Fon in the turned-on state of the discharge lamp after a start signal is issued and the discharge lamp is started by the signal.

The starting circuit 4 is provided to supply a start signal to the discharge lamp 10. The output voltage of the start circuit 4 at starting is boosted by the transformer 7 and the resulting voltage is applied to the discharge lamp 10. In other words, a start signal is overlaid on the AC-converted output before the output is supplied to the discharge lamp 10. In this example, one of the output terminals of the starting circuit 4 is connected at some midpoint to the primary winding 7*p* of the transformer 7 and the other output terminal is connected to one end (ground side terminal) of the primary winding 7*b*. The invention is not limited thereto but, for example, an input voltage to the starting circuit may be obtained from the secondary side of the transformer 7. Or, auxiliary winding (winding 11 mentioned later) of the transformer may be provided as well as the inductance element 9 in order for the auxiliary winding to obtain an input voltage to the starting circuit.

As shown in FIG. 1, in a circuit configuration where the DC-to-AC converter circuit 3 is used to convert a DC input to an AC current and boost the voltage in order to perform power control of a discharge lamp, in case a current flowing in the discharge lamp 10 or a voltage applied to the discharge lamp 10 is to be detected, winding may be added to the inductance element 9 for resonance and the transformer 7 to obtain the detected current value and detected voltage value of the discharge lamp.

In the example shown in FIG. 1, auxiliary winding 11 for forming a transformer together with the inductance element 9 is provided to detect a current corresponding to a current flowing in the discharge lamp 10 and the output of the auxiliary winding 11 is supplied to a current detection circuit 12. That is, a current flowing in the discharge lamp is detected using the inductance element 9 and the auxiliary winding 11 and the detection result is supplied to the control section 6 and used to control the power of the discharge lamp 10 and determine whether the discharge lamp is on or off.

Detection of a voltage applied to the discharge lamp 10 is performed based on, for example, the output of detection winding 7*v* provided on the transformer 7. In this example, the output of the detection winding 7*v* is supplied to a voltage detection circuit 13, which obtains a detected voltage corresponding to a voltage applied to the discharge lamp 10. The detected voltage is output to the control section 6 and used to control the power of the discharge lamp 10 and determine whether the discharge lamp is on or off.

Various forms may be employed concerning a method for detecting a current flowing in the discharge lamp or a voltage applied thereto, such as providing a resistor for detecting a current in the secondary circuit of the transformer 7. Any circuit configuration may be used.

Figure 2:
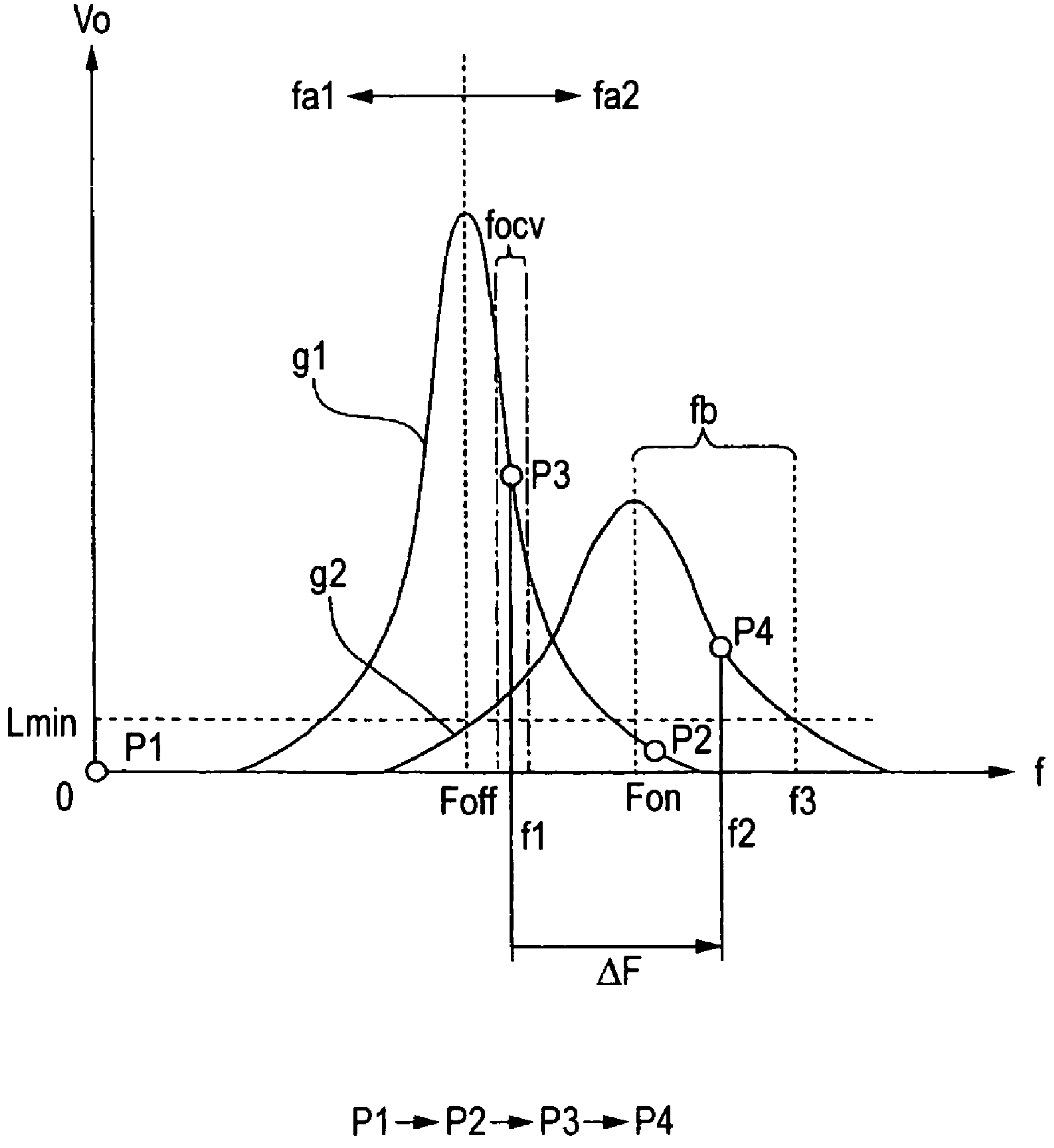
FIG. 2 illustrates a control form.

FIG. 2 is a schematic graph for illustrating a control form. The horizontal axis is in frequencies [f] and the vertical axis in output voltages [Vo] of the lighting circuit and the graph shows a serial resonance curve assumed when the discharge lamp is turned off [g1] and a serial resonance curve assumed when the discharge lamp is turned on [g2].

When the discharge lamp is turned off, the secondary side of the transformer is at high impedance. The primary side of the transformer shows a high inductance value and the resonance curve g1 of the resonance frequency Foff is obtained. When the discharge lamp is turned on, the secondary side of the transformer is at low impedance (some tens to hundreds of ohms). The primary side of the transformer shows a low inductance value and the resonance curve g2 of the resonance frequency Fon is obtained (the amount of variation in a voltage is relatively small when the discharge lamp is turned on and mainly the current shows a large change).

The meaning of each of the labels in the figure is explained below.

"fa1"=Frequency range of "f<Foff" (capacitive range or advanced-phase range positioned on the left side of "f=Foff")

"fa2"=Frequency range of "f>Foff" (inductive range or delayed-phase range positioned on the right side of "f=Foff")

"fb"=Frequency range positioned at "f>Fon" (frequency range assumed when the discharge lamp is turned on; in the inductive range positioned on the right side of "f=Fon")

"focv"=Control range of output voltage assumed before the discharge lamp is turned on (when the discharge lamp is turned off) (hereinafter referred to as the "OCV control range"). This range is positioned in close proximity to Foff in fa2).

"Lmin"=Output level capable of keeping the discharge lamp lit.

"P1"=Operation point assumed before the power is supplied.

"P2"=Initial operation point assumed when the power is just supplied (in the range fb).

"P3"=Operation point showing a time point the OCV target value is reached while the discharge lamp is off (in fcv).

"P4"=Operation point assumed aster the discharge lamp is turned on (in the range fb).

"f1"=Driving frequency of a switching element assumed just before the discharge lamp is turned on (for example the driving frequency at the operation point P3).

"f2"=Driving frequency of a switching element assumed while the discharge lamp is turned on (for example, the driving frequency at the operation point P4).

"f3"=Frequency at the intersection of g2 and "Vo=Lmin".

The flow of Lighting shift control related to a discharge lamp is itemized, for example, as follows.

(1) Input a circuit power supply (P1→P2)

(2) Input power in the OCV control range (P2→P3).

(3) Generate a starting pulse and apply the starting pulse to the discharge lamp (P3).

(4) Immediately after the discharge lamp is turned on, fix the value of a lighting frequency (driving frequency of a switching element) over a predetermined range (hereinafter referred to as the "frequency-fixed term") (P3).

(5) Shift to power control in fb (P3→P4)

Immediately after the power supply is input or immediately after the discharge lamp is turned off after it was once turned on, the driving frequency is shifted to a frequency range fb (P1→P2). That is, the frequency is temporarily raised and then gradually lowered toward f1 (P2→P3).

OCV control is performed in fcv, a start signal for the discharge lamp is generated, and the signal is applied to turn on the discharge lamp. For example, as the frequency is lowered to approach the resonance frequency Foff from the high frequency side in the OCV control, the output voltage Vo gradually increases and the target value is reached at the operation point P3. Note that a method for making OCV control in the range fa1 when the discharge lamp is turned off before it is turned on results in a considerable loss in the switching loss thus worsening the circuit efficiency. In a method for making OCV control in the range fa2, care should be taken so as not to prolong the term when the circuit is continuously operated under no load.

At the operation point P3, when the discharge lamp is started by the starting circuit 4, the frequency is fixed over a certain term and is shifted to the range fb (refer to "ΔF" in FIG. 2). In a frequency shift from the range focv to the range fb, the frequency is preferably varied from f1 to f2 immediately after the discharge lamp has started to illuminate.

Figure 3:
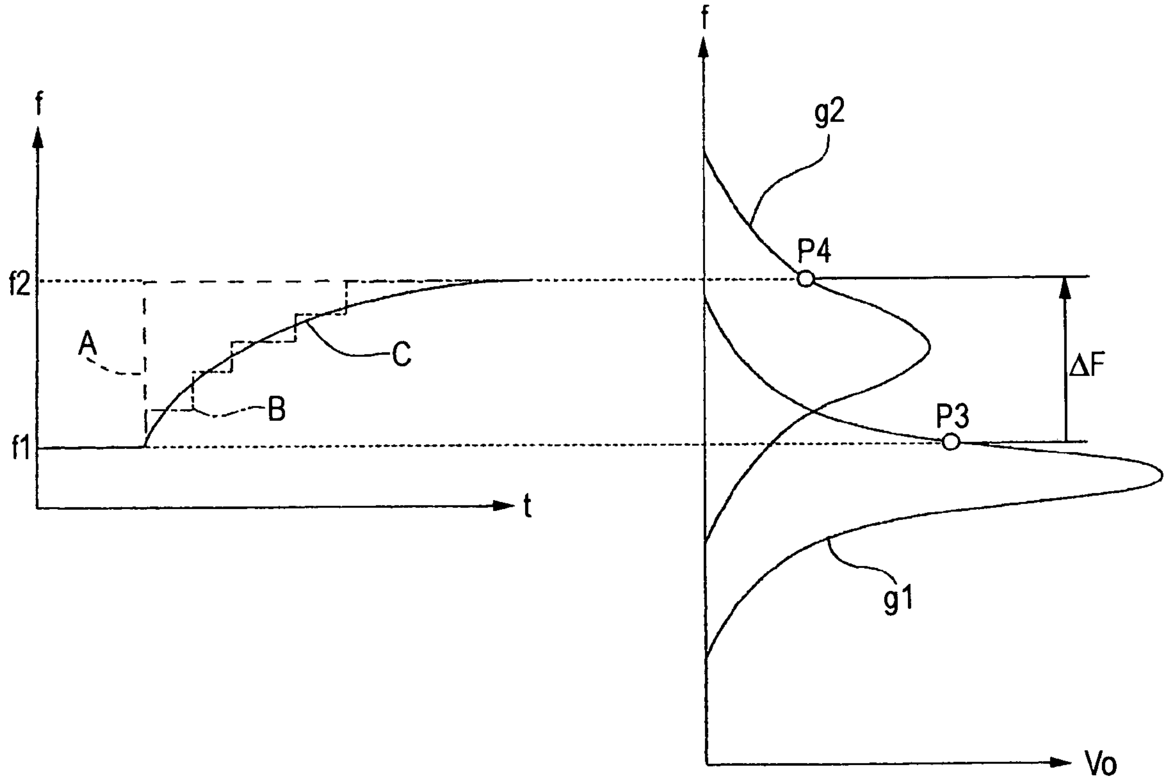
FIG. 3 illustrates lighting shift control.

FIG. 3 is a conceptual explanatory drawing on the lighting shift control from f1 to f2. The left side shows a temporal change of the frequency f while the right side shows the characteristic of the frequency f versus output voltage Vo.

As shown by Graph Line A, it is experimentally proven that a method for making a shift from f1 to f2 without making a pause involves a high probability of failure at the cold start of the discharge lamp (the discharge lamp is not stably lit).

A control method shown below is proposed in a shift from f1 to f2.

Multistage control method (quasi-continuous control method) (refer to Graph Line B).

Continuous control method (refer to Graph Line C).

Considering a simplified circuit configuration, a method for continuously making a shift from f1 to f2 is preferable. As in a circuit example given later, it is possible to change the driving frequency from f1 to f2 by using a time constant circuit.

By providing a predetermined frequency-fixed term as shown above (4) instead of directly shifting the frequency f to the range fb right after the discharge lamp is started, it is possible to reliably shift to a steady lighting state without possible blackout or unstable lighting of the discharge lamp.

In case the discharge lamp has turned off by some cause other than a turning-off instruction, the above lighting shift control is resumed. The control basically returns to P2 and then proceeds from P2 to P3 then p4; for example, in case the direct input voltage has dropped, the frequency is lowered and a shift to P3 is performed.

A particular circuit configuration example will be described to which embodiments of the invention are applied.

Figure 4:
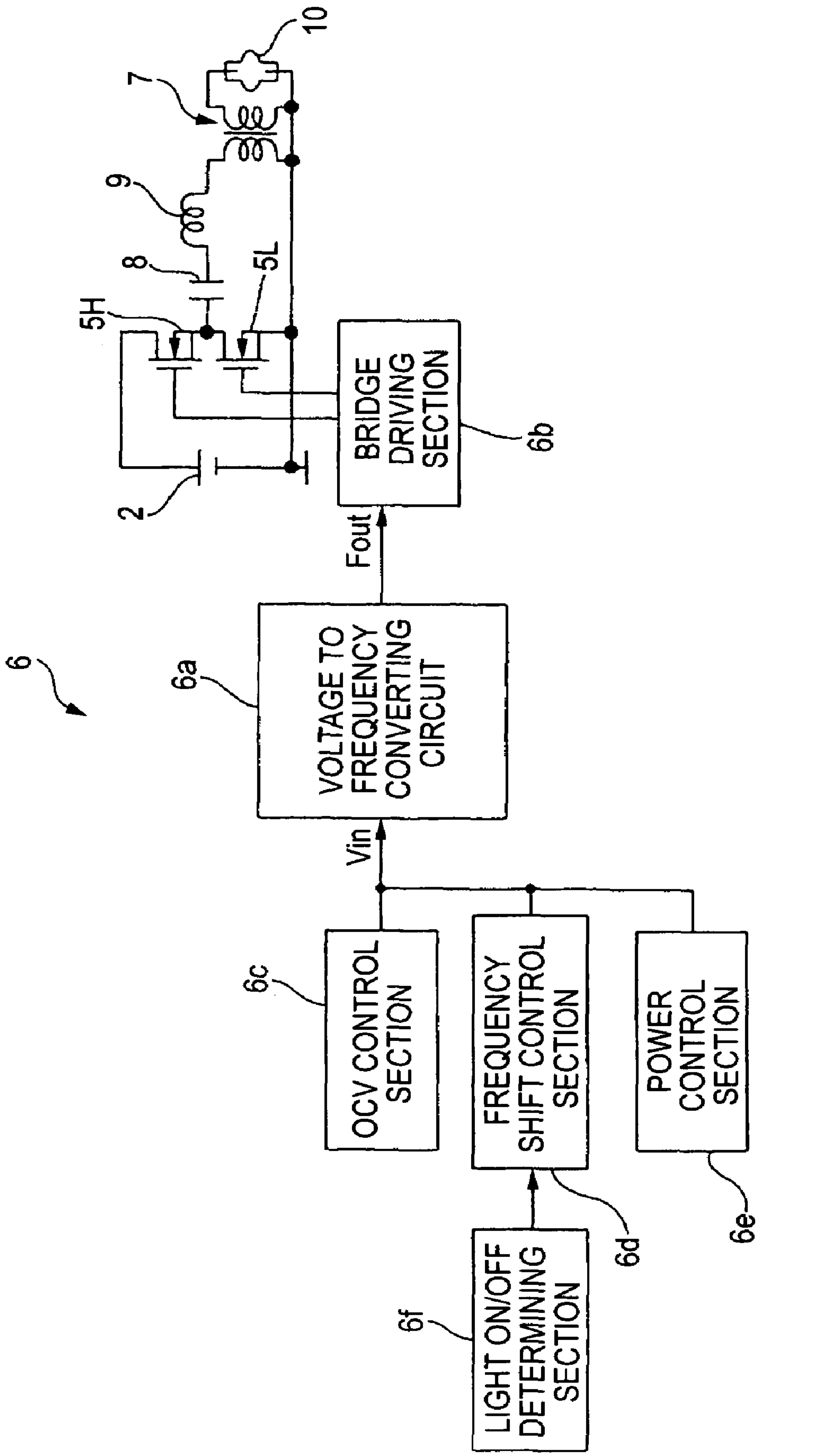
FIG. 4 shows a circuit configuration example of a control section.

FIG. 4 mainly shows an exemplary circuit configuration of the control section 6 that uses a voltage-to-frequency converter circuit (hereinafter referred to as the "V-F converter circuit") whose frequency varies depending on the input voltage. "Vin" in FIG. 4 represents the input voltage of the V-F converter circuit 6*a* while "Fout" represents the frequency of an output voltage converted by the V-F converter circuit 6*a*.

The V-F converter circuit 6*a* in this example has a control characteristic where the higher Vin is, the lower Fout becomes. The output voltage of the V-F converter circuit 6*a* is supplied to a bridge driving section 6*b* in the rear stage. The output signal of the bridge driving section 6*b* is output to the control terminals of the switching elements 5H, 5L. For example, in a frequency range higher than the resonance frequency Foff, the greater the Vin value is, the lower the Fout value becomes, and as a result, control is performed so that the output power (or voltage) will increase. The smaller the Vin value is, the higher the Fout value becomes and control is performed so that the output power (or voltage) will decrease.

As understood from the foregoing description, Vin is a control voltage related to frequency control of a switching element (hereinafter referred to as the "frequency control voltage") and specified by, for example, the output of each of an OCV controller 6*c*, a frequency shift controller 6*d*, and a lighting power controller 6*e*.

The OCV controller 6*c* is a circuit for controlling the open-circuit voltage (OCV) before the discharge lamp is turned on. The output signal of the OCV controller 6*c* is output to the V-F converter circuit 6*a*. The OCV controller 6*c* has a feature to increase the power supplied to the discharge lamp as the driving frequency drops in the OCV control. The OCV controller 6*c* comprises, for example, an operational amplifier whose input signal is the voltage detection signal of the discharge lamp.

The frequency shift controller 6*d* receives a signal (binary signal corresponding to on/off of the discharge lamp) from a lamp on/off determination circuit 6*f*, fixes the driving frequency of the switching elements 5H, 5L to f1 for a certain term immediately after the discharge lamp is lit (frequency-fixed term) and continuously varies the driving frequency from f1 to f2 after the term has elapsed. The output signal of the frequency shift controller 6*d* is supplied to the V-F converter circuit 6*a*.

Frequency shift from f1 to f2 may be subjected to the control listed below.

(α) Control form where the frequency gradually approaches from f1 to f2 with a certain time constant;

(β) Control form where when the frequency positioned between f1 and f2 is represented as "fw", the speed of frequency variation from Fw to f2 is different from that of the frequency variation from F1 to fw.

Figure 5:
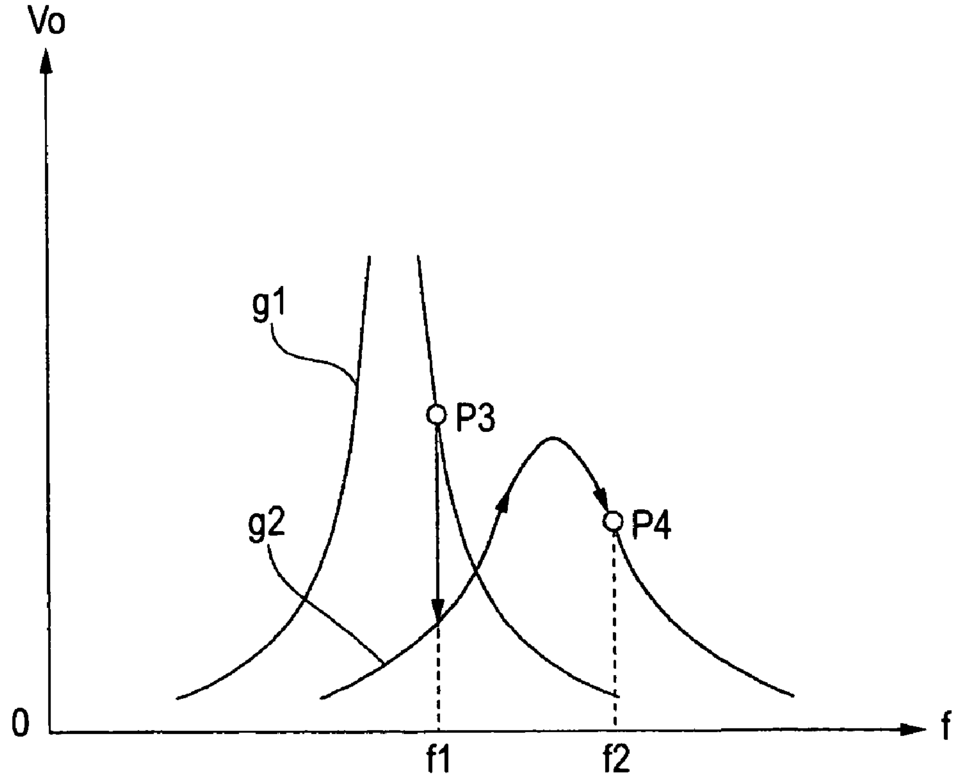
FIG. 5 shows a control example of a frequency shift.
Figure 6:
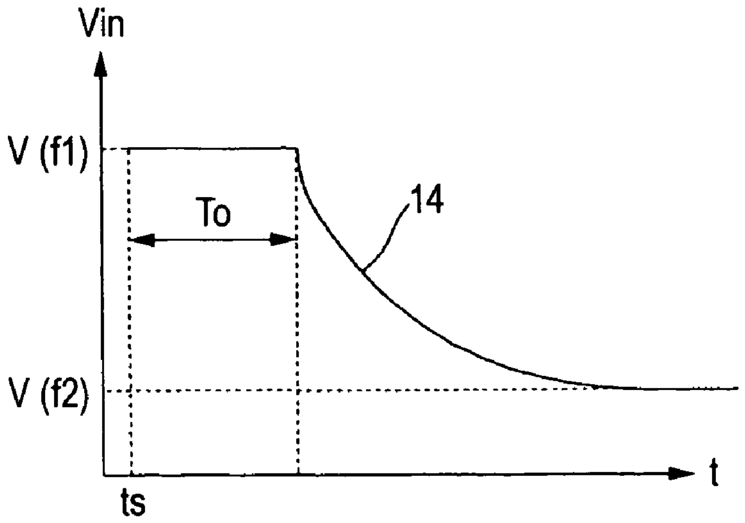
FIG. 6 shows a temporal variation example of a frequency control voltage in a frequency shift.

FIGS. 5 and 6 explain the form (α).

FIG. 5 shows an example of shift control from f1 to f2 in the characteristic of the output voltage Vo versus frequency f.

At the operation point P3 on a resonance curve g1, the frequency is fixed to a certain value f1 in a term when the current flowing in the discharge lamp is stabilized to some degree (frequency-fixed term). After that, the frequency is gradually varied over several hundreds of milliseconds from f1 to f2.

FIG. 6 schematically shows the temporal variations in the frequency control voltage (Vin). The horizontal axis is laid off in time "t" and the vertical axis in voltages.

Meaning of each sign shown in FIG. 6 is as follows:

"V(f1)"=Frequency control voltage value corresponding to the frequency f1

"V(f2)"=Frequency control voltage value corresponding to the frequency f2

"T0"=Frequency-fixed term (several tens of milliseconds)

"ts"=time point the discharge lamp is started (or time point the discharge lamp is determined on)

As shown by a graph line 14, the term from when the discharge lamp is started to T0 is represented as "V=V(f1)". When the frequency-fixed term has elapsed, the frequency control voltage decreases exponentially with a predetermined time constant and gradually approaches V(f2). That is, as the frequency control voltage drops, the driving frequency gradually rises to approach f2.

Figure 7:
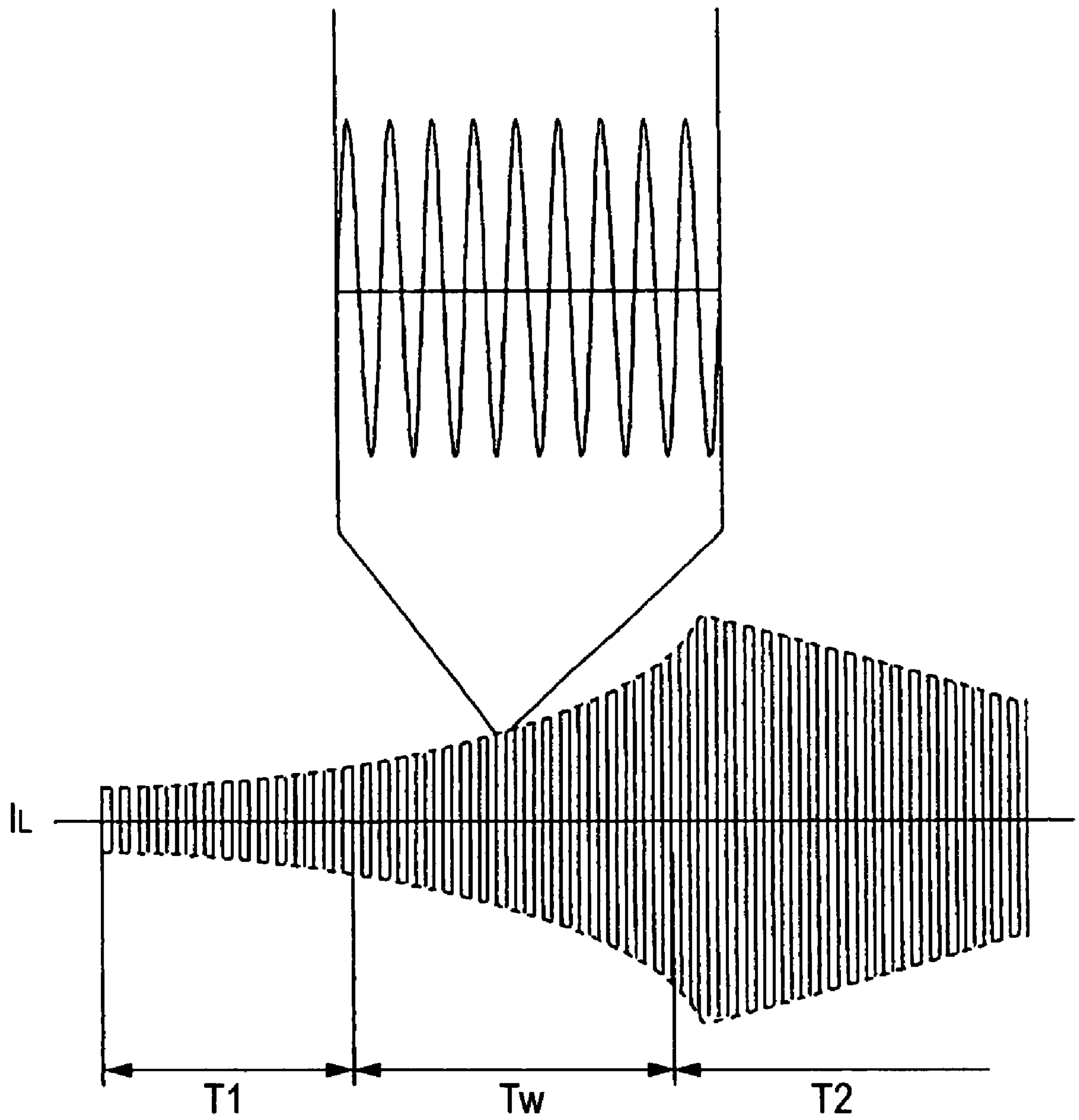
FIG. 7 schematically shows the temporal variation in the lamp current.

FIG. 7 schematically shows the temporal variation in the lamp current "IL" assumed after the frequency-fixed term has elapsed (the actual waveform is a sine wave as shown in the exploded partial view).

Meaning of each term T1, Tw and T2 is as follows:

"T1"=Term when the frequency has started to rise from f1

"Tw"=Term positioned between T1 and T2

"T2"=Term where the maximum output is obtained at Fon and then the frequency is shifted to f2

What is important is the term "Tw". An operation point in this section is in the range left to g2 (capacitive range).

Whether the circuit characteristic (output impedance characteristic) assumed when the discharge lamp is lit is capacitive or inductive leads to different lighting properties. In the capacitive range (f<Fon), variations in the voltage is suppressed. In the inductive range (f>Fon), variations in the current is suppressed.

In the capacitive range, the current is variable so that power may be supplied to a cold electrode of a discharge lamp by increasing the supply current, which makes it easy to keep discharging. After the electrode of the discharge lamp is warmed up in the capacitive range, the driving frequency is gradually increased to shift itself to the frequency f2 in the inductive range, thereby reliably shifting to a stable lighting state. That is, it is preferable that in the range where the output impedance of the circuit assumed when the discharge lamp is lit is capacitive, the electrode is warmed up under conditions that discharge is easy to maintain and the driving frequency is shifted to the inductive range.

In the inductive range, variation in the current is suppressed so that the power is likely to be stable, which is an advantage in terms of power control.

Figure 8:
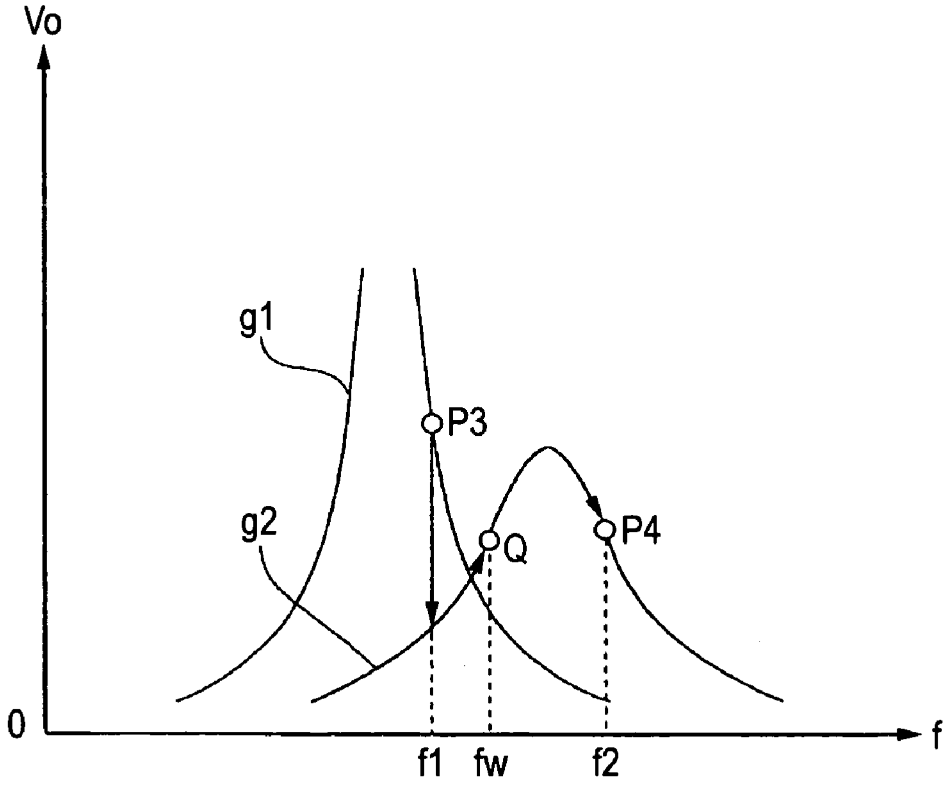
FIG. 8 shows another control example of a frequency shift.
Figure 9:
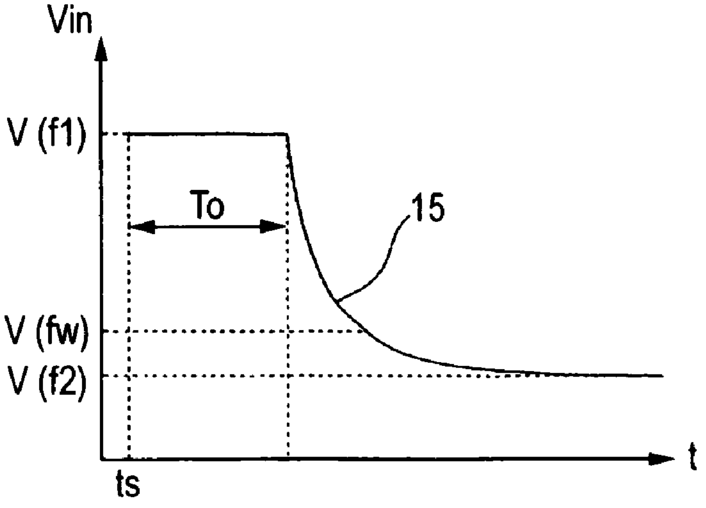
FIG. 9 shows another temporal variation example of a frequency control voltage in a frequency shift.

FIGS. 8 and 9 explain the form (β).

FIG. 8 shows an example of shift control from f1 to f2 via fw in the characteristic of the output voltage Vo versus frequency f.

At the operation point P3 on a resonance curve g1, the frequency is fixed to a certain value f1 in the frequency-fixed term. After that, the frequency is gradually increased over several tens of milliseconds from f1 to fw, and is gradually varied over several hundreds of milliseconds from fw to f2.

In this form, the fw value (refer to the operation point Q in the figure) is specified so as to satisfy the relationship of "f1<fw<Fon" between f1, fw and Fon.

FIG. 9 schematically shows the temporal variations in the frequency control voltage (Vin). The horizontal axis is in time "t" and the vertical axis in voltages.

"F(fw)" in FIG. 9 represents a frequency control voltage value corresponding to the frequency fw. As shown by a graph line 15, when the frequency-fixed term (T0) has elapsed, by way of example, the voltage decreases exponentially from V(f1) with a predetermined time constant to reach V(fw), and then gradually decreases to approach V(F2).

The speed of variation (rate of variation of speed with respect to time) over a shift from V(f1) to V(Fw) is larger than the speed of variation over a shift from V(fw) to V(f2). It is thus possible to do without or substantially shorten the term "T1" shown in FIG. 7 (and by extension to shorten the shift time to f2).

In case the variation speed of the driving frequency changing from f1 to fw is represented as "Δf1*w*/Δt", the variation speed of the driving frequency changing from fw to f2 is represented as "Δfw2/Δt", and the magnitude of the variation speed is represented using an absolute value sign "||", the relationship "|Δf1*w*/Δt|>|Δfw2/Δt|" is held.

As mentioned above, it is important to make a frequency shift to the inductive range via the capacitive range of less than Fon in the lighting shift control. It is desirable to provide a sufficient shift term from fw to f2 compared with the shift term from f1 to fw. This shortens the length of the shift term from f1 to f2 compared with the case of (α).

While an exemplary control case has been described using the variation speed of a driving frequency changing from f1 to fw after the discharge lamp is lit and the variation speed of a driving frequency changing from fw to f2 after fw is reached, more than one frequency switching point equivalent to fw may be set, although the minimum necessary switching control is preferable when considering a complicated circuit configuration.

It has been proven that the lighting property of a discharge lamp is not practically obstructed when the time period required for a shift from f1 to f2 is from 10 milliseconds to one second inclusive. That is, when the time is less than 10 milliseconds, the residence time in the capacitive range is too short to provide good lighting. When the time exceeds one second, variations in the amount of light that accompany variations in the current could cause flickering. For example, this will cause an adverse effect on the visibility of a driver in an application to a light source for a vehicular headlamp.

It is preferable to secure a sufficient residence time near Fon and alleviate variations in the lamp current by making control so that the magnitude of variation speed of the driving frequency is decreased as the frequency approaches f2. This prevents possible flickering by suppressing a sudden variation in the amount of light.

The lighting power controller 6*e* (refer to FIG. 4) controls the input power after the driving frequency has shifted from f1 to f2. The output signal of the lighting power controller 6*e* is supplied to the V-F converter circuit 6*a*. A known configuration may be used because any circuit configuration related to the lighting power controller 6*e* is allowed in an application of embodiments of the invention. For example, an error amplifier for performing arithmetic operation based on the voltage detection signal or current detection signal of a discharge lamp or a limiter (for a lower limit) for limiting the control output so that the driving frequency will not drop below Fon when the discharge lamp is lit may be provided.

The highest voltage among the outputs of the OCV controller 6*c*, the frequency shift controller 6*d* and the lighting power controller 6*e* is employed. This voltage is supplied to the V-F converter circuit 6*a* as the frequency control voltage "Vin". The output signal of a frequency obtained by converting Vin is supplied as a control signal to the switching elements 5H, 5L via the bridge driving section 6*b*.

Next, the lamp on/off determination circuit 6*f* for determining whether the discharge lamp is lit will be described before the circuit configuration of the frequency shift controller 6*d* as a main part of the control section 6.

Figure 10:
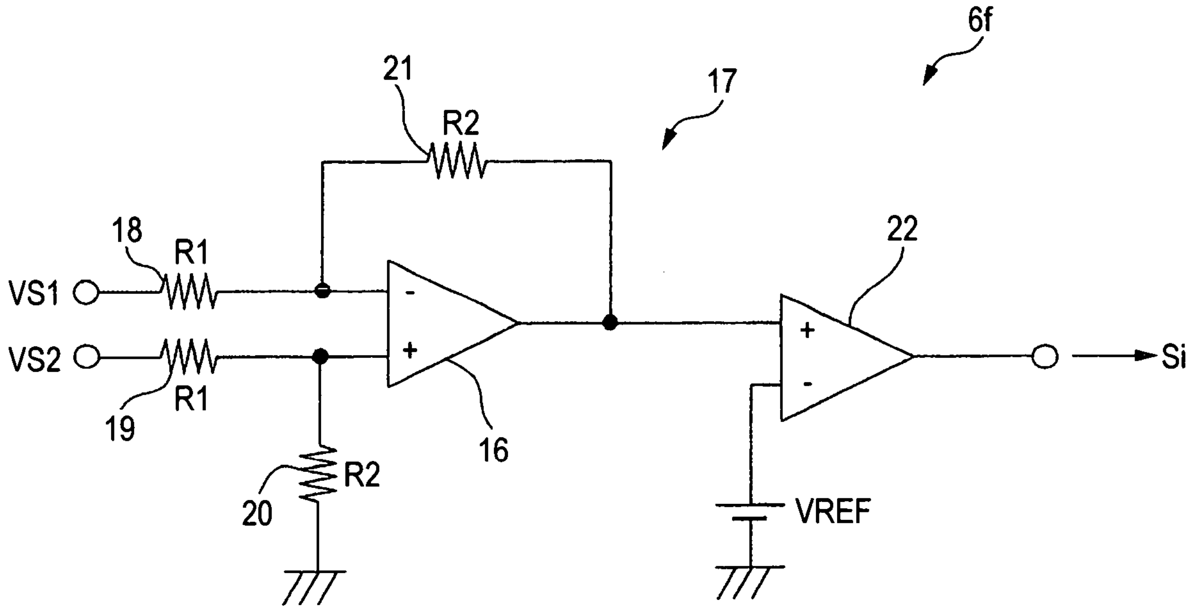
FIG. 10 is a is a circuit diagram showing a configuration example of the lamp on/off determination circuit.

FIG. 10 is a circuit diagram showing a configuration example of the lamp on/off determination circuit 6*f*.

Detection of a current flowing in a discharge lamp may use, for example, a detector circuit including a diode or a capacitor. An AC signal detected using an inductance element 9 and auxiliary winding 11 is converted to a DC signal (the detected voltage is represented as "VS1").

Detection of a voltage applied to the discharge lamp uses, for example, detection winding 7*v*. Further, a capacitor is used to divide the voltage to obtain a detected voltage (represented as "VS2").

The detected voltages VS1, VS2 are supplied to a subtraction circuit 17 using an operational amplifier 16. That is, VS1 is supplied to the inverted input terminal of the operational amplifier 16 via resistors 19 and 20. The resistor 20 has one end connected to the non-inverted input terminal of the operational amplifier 16 and the other end grounded. The resistor 21 is inserted between the inverted input terminal and the output terminal of the operational amplifier 16. The resistance value of the resistor 18 and that of the resistor 19 is equal to each other ("R1"). The resistance value of the resistor 20 and that of the resistor 20 is equal to each other ("R2").

The operational amplifier 16 supplies the output "(R2/R1)·(VS2−VS1)" proportional to the difference between VS2 and VS1 to the positive input terminal of a comparator positioned in the rear stage. To the negative input terminal of the comparator is supplied a predetermined reference voltage (represented as "VREF"). The arithmetic operation result proportional "VS1—VS1" is compared with VREF in order to determine whether the discharge lamp is turned on or off. That is, in case the output level of the operational amplifier 16 is VREF or more, the output signal of the comparator 22 is driven High, which means that the discharge lamp is turned off. In case the output level of the operational amplifier 16 is less than VREF, the output signal of the comparator 22 is driven Low, which means that the discharge lamp is turned on.

This example includes a circuit for subtracting a detected current value from a detected voltage value related to the discharge lamp and comparing the result with a threshold voltage. This obtains the lamp on/off determination signal of the discharge lamp (hereinafter referred to as "Si") as a binary signal from the comparator 22. The invention is not limited to this configuration but various types of lamp on/off determination circuit may be used.

Figure 11:
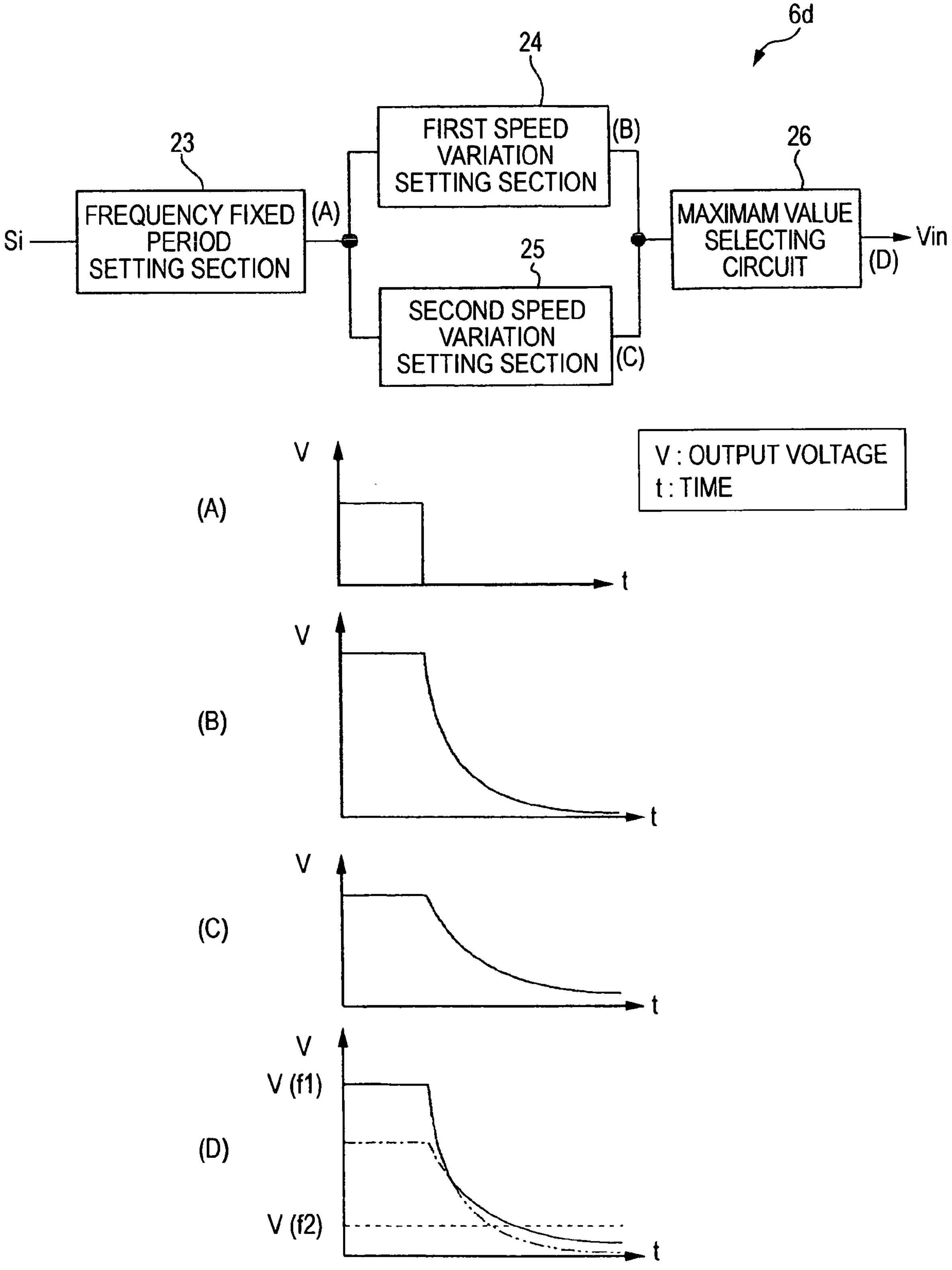
FIG. 11 shows a configuration example of a frequency shift controller.

FIG. 11 shows a configuration example of a frequency shift controller 6*d* to which the form (β) is applied. The frequency shift controller 6*d* comprises a frequency-fixed term setting section 23, a first variation speed setting section 24, a second variation speed setting section 25, and a maximum value selection circuit 26.

The frequency-fixed term setting section 23 is provided to fix the driving frequency to f1 over a certain term from the time point the discharge lamp is lit. To the frequency-fixed term setting section 23 is input the signal Si from the lamp on/off determination circuit 6*f* and a signal of a predetermined pulse width is output therefrom, as shown in (A) in FIG. 11.

The first variation speed setting section 24 and the second variation speed setting section 25 are arranged in parallel with each other in the rear stage of the frequency-fixed term setting section 23.

The first variation speed setting section 24 has a circuit (time constant circuit) for specifying the variation speed "Δf1*w*/Δt" of the driving frequency changing from f1 to fw. As shown in (B), an output signal whose initial voltage (constant voltage value) is high and gradually approaching 0 via a steep trailing edge is output to the maximum value selection circuit 26.

The second variation speed setting section 25 has a circuit (time constant circuit) for specifying the variation speed "Δfw2/Δt" of the driving frequency changing from the fw to f2. As shown in (C), an output signal whose initial voltage is lower than (B) and gradually approaching 0 via a relatively mild trailing edge is output to the maximum value selection circuit 26.

The maximum value selection circuit 26 receives output signals from the first variation speed setting section 24 and the second variation speed setting section 25 and selects one with a larger signal level, and supplies the output result shown by solid lines in (D) as the frequency control voltage Vin to the V-F converter circuit 6*a*. Up to the frequency-fixed term and a certain time after the term has elapsed, the voltage level of (B) is higher than the voltage level of (C) shown by alternate long and short dashed lines. In the subsequent term, the voltage level of (C) is higher than the voltage level of (B) shown by chain double-dashed lines. The output signal of the lighting power controller 6*e* is also supplied to the maximum value selection circuit 26 and the voltage level of the signal is assumed as "V(f2)" so that the output voltage level of the lighting power controller 6*e* is selected from a time point the voltage level of (D) drops below V(f2).

Figure 12:
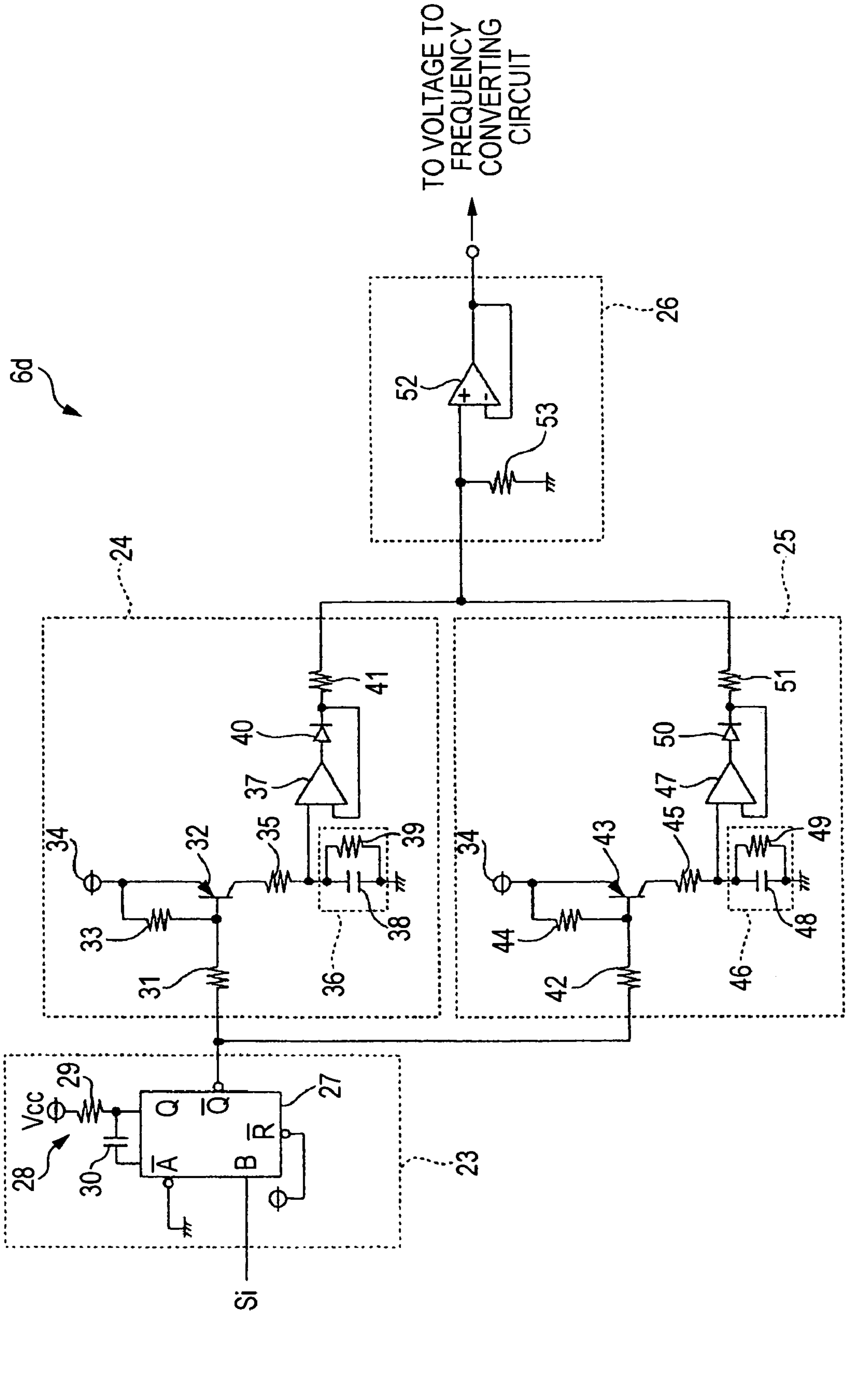
FIG. 12 s a circuit diagram illustrating a configuration example of the frequency shift controller.

FIG. 12 is a circuit diagram illustrating a specific configuration of the frequency shift controller 6*d*.

In this example, a retriggerable monostable multivibrator IC 27 is used in the frequency-fixed term setting section 23. To the trigger input terminal "B" (non-inverted phase input) of the frequency-fixed term setting section 23 is supplied the signal Si from the lamp on/off determination circuit 6*f*. The output of the IC is supplied from the Q bar output (inverted phase output) terminal to the first and second variation speed setting sections 24 and 25. A timing circuit for determining the output signal width is connected to the IC 27 via a resistor 29 and a capacitor 30.

In the first variation speed setting section 24, the output signal of the frequency-fixed term setting section 23 is supplied to the base of a PNP transistor 32. A resistor 33 is inserted across the emitter and the base of the transistor 32. The resistor 33 and the emitter are connected to the power terminal 34 of a predetermined voltage.

The collector of the transistor 32 is connected to a time constant circuit 36 and an operational amplifier 37 via a resistor 35. The time constant circuit 36 includes a capacitor 38 (its capacitance is represented as "C38") and a resistor 39 (its resistance value is represented as "R39") connected in parallel with each other. One end of the capacitor 38 and one end of the resistor 39 are connected to the resistor 35 and the non-inverted input terminal of the operational amplifier 37 and the other end of each of these is grounded.

The output terminal of the operational amplifier 37 is connected to the anode of a diode 40. The cathode of the diode is connected to the inverted input terminal of the operational amplifier 37 as well as the maximum value selection circuit 26 via a resistor 41.

The second variation speed setting section 25 has the same configuration as that of the first variation speed setting section 24 except that set values are different between the time constant circuits. That is, the output signal of the frequency-fixed term setting section 23 is supplied to the base of the PNP transistor 43 via the resistor 42. A resistor 44 is inserted across the emitter and the base of the transistor 43. The resistor 44 and the emitter are connected to the power terminal 34 of a predetermined voltage.

The collector of the transistor 43 is connected to a time constant circuit 46 and an operational amplifier 47 via a resistor 45. The time constant circuit 46 includes a capacitor 48 (its capacitance is represented as "C48") and a resistor 49 (its resistance value is represented as "R49") connected in parallel with each other. One end of the capacitor 48 and one end of the resistor 49 are connected to the resistor 45 and the non-inverted input terminal of the operational amplifier 47 and the other end of each of these is grounded. For the setting of the CR value of the time constant circuits 36, 46, the relationship "C38·R38<<C48·R49" is specified so that the variation speed of the driving frequency changing from fw to f2 is sufficiently lower than the variation speed of the driving frequency changing from f1 to fw.

The output terminal of the operational amplifier 47 is connected to the anode of a diode 50. The cathode of the diode is connected to the inverted input terminal of the operational amplifier 47 as well as the maximum value selection circuit 26 via a resistor 51.

The maximum value selection circuit 26 comprises an operational amplifier 52. The non-inverted input terminal of the maximum value selection circuit 26 is connected to the resistors 41, 51 and grounded via a resistor 53. The output signal of the operational amplifier is output as the frequency control voltage Vin to the V-F converter circuit 6*a*.

In this example, the transistors 32, 43 are turned on in the first and second variation speed setting section 24, 25 in a term when the output signal of the frequency-fixed term setting section 23 is driven Low (the voltage phase is inverted compared with FIG. 11(A)) and the output voltage of each variation speed setting section is fixed to a certain value. When the output signal of the frequency-fixed term setting section 23 is driven High from Low, the transistors 32, 43 are turned off and the output voltage of the first variation speed setting section 24 changes in accordance with the time constant "C38·R39" and the output voltage of the second variation speed setting section 25 changes in accordance with the time constant "C48·R49". The output of each of the operational amplifiers 37, 47 provided in the output stage of each of the variation speed setting sections 24, 25 is input to the maximum value selection circuit 26 via the diode 40, 50, and one with a higher voltage level is selected to obtain the frequency control voltage Vin.

The invention is not limited to this example, but various configurations are possible including use of an adding circuit instead of the maximum value selection circuit 26.

In case the form (α) is employed, the maximum value selection circuit 26 is not required. Only one variation speed setting section should be arranged and its output signal should be directly supplied to the V-F converter circuit. That is, the temporal variation in the frequency control voltage Vin is specified in accordance with the time constant determined by the capacitance value and the resistance value of the time constant circuit (CR circuit) in the variation speed setting section.

Figure 13:
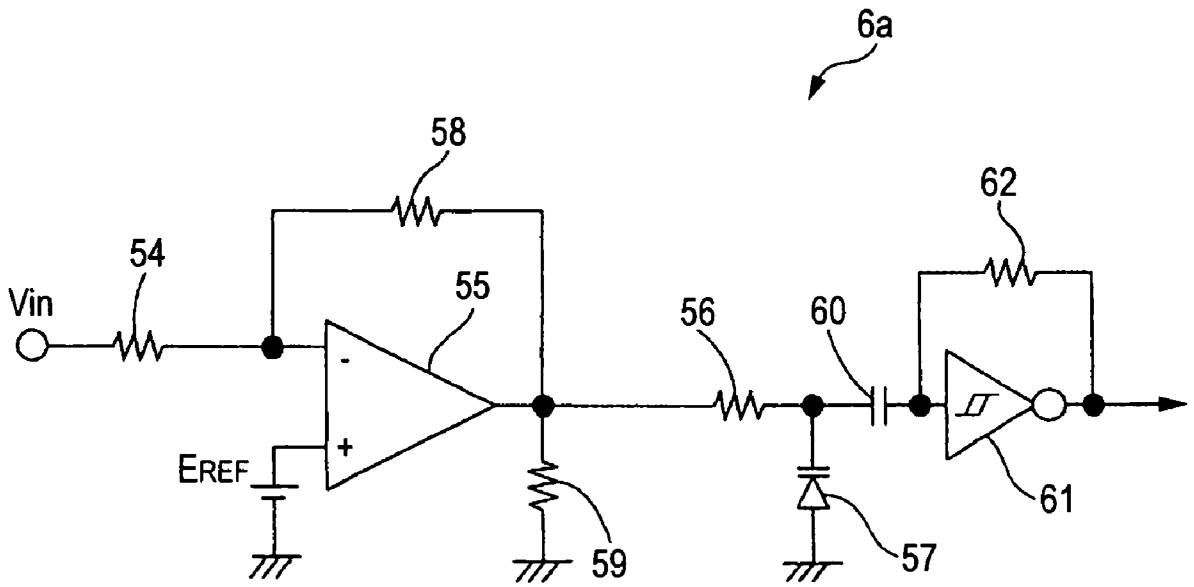
FIG. 13 shows a configuration example of a V-F converter circuit.

FIG. 13 shows key parts of an exemplary configuration of the V-F converter circuit 6*a*.

The frequency control voltage Vin is supplied to the inverted input terminal of the operational amplifier 55 via the resistor 54. To the non-inverted input terminal of the operational amplifier 55 is supplied a predetermined reference voltage "EREF". The output signal of the operational amplifier 55 is applied to a varactor 57. A resistor 59 is inserted between the inverted input terminal and output terminal of the operational amplifier 55. One end of the resistor 59 is connected to the output terminal of the operational amplifier 55 and the other end thereof is grounded.

The varactor 57 has a cathode connected between the resistor 56 and the capacitor 60 and a grounded anode. A Schmitt trigger NOT gate 61 has an input terminal connected to the cathode of the varactor 57 via the capacitor 60. A resistor 62 is connected in parallel with the NOT gate 61. These elements for a variable-frequency oscillation circuit and the output pulse of the NOT gate 61 is output to the bridge driving section 6*b* in the rear stage.

In this example, as the level of Vin increases (decreases), the output voltage of the operational amplifier 55 drops (rises) and the capacitance of the varactor 57 increases (decreases). Thus, the frequency of the output pulse drops (rises).

The invention is not limited to the above configuration example, but a configuration may be used where the frequency increases as Vin increases in the voltage-frequency characteristics.

In the above lighting method, or a discharge lamp lighting method that uses, in DC-to-AC conversion using a transformer and a plurality of switching elements and capacitors, serial resonance including the transformer or an inductance element and a capacitor, the following procedure is used to perform lighting shift control.

(1) Before the discharge lamp is lit: Driving control is performed so that the driving frequency of the switching element will gradually approach Foff (resonance frequency assumed when the discharge lamp is off). Once an OCV value that allows lighting is reached, a start signal is supplied to the discharge lamp to stat the discharge lamp.

(2) After the discharge lamp is lit: The driving frequency is fixed to the frequency f1 immediately before lighting (driving frequency at OCV control) for a certain term. The frequency is continuously varied from f1 to f2 in order to shift the driving frequency of the switching element to a frequency range fb that is higher than Fon (resonance frequency assumed when the discharge lamp is on).

The above configuration provides various advantages described below.

One or more embodiments of the invention allow for reliably performing lighting control of a discharge lamp in a frequency shift from the OCV control range assumed when the discharge lamp is off to the frequency range fb assumed when the discharge lamp is on.

One or more embodiments of the invention allow for securing the residence time at an operation point in a range where the circuit output impedance assumed when the discharge lamp is on is capacitive and shifting to an inductive range with the electrode of the discharge lamp warmed up (In particular, this improves the lighting property at the cold start of the discharge lamp thus reducing the probability of unstable lighting or blackout.)

One or more embodiments of the invention allow for setting fw (or a plurality of fws) in the middle of a frequency shift from f1 to f2 and effecting two-stage (or multistage) frequency change thus reducing the shift time to stable lighting.

One or more embodiments of the invention allow for controlling the frequency variation speed (ratio of variation of frequency with respect to time) in accordance with the setting of the time constant circuit in order to simplify the circuit configuration and facilitate the control process One or more embodiments of the invention allow for circuit configuration including a pair of switching elements (5H, 5L) and a transformer (7) performing both DC-to-AC conversion and boosting of a start signal that is advantageous in terms of circuit downsizing and lower cost.

What is claimed is:

1. A discharge lamp lighting circuit, comprising:

a DC-to-AC converter circuit which receives an input DC voltage to perform DC-to-AC conversion;

a starting circuit which supplies a start signal to a discharge lamp; and a control section which controls power output from the DC-to-AC converter circuit, wherein the DC-to-AC converter circuit includes a plurality of switching elements driven by the control section, and a serial resonance circuit including an inductance element or a transformer and a capacitor, and where a resonance frequency of the serial resonance circuit assumed when the discharge lamp is turned off is represented as "Foff", a driving frequency of the switching elements assumed immediately before the discharge lamp is turned on is represented as "f1", the resonance frequency of the serial resonance circuit assumed when the discharge lamp is turned on is represented as "Fon", and the driving frequency of the switching elements assumed when the discharge lamp is turned on is represented as "f2", before the discharge lamp is turned on, a driving control of the switching elements is performed so that the driving frequency gradually approaches Foff and the start signal is supplied to the discharge lamp, and after the discharge lamp initiates to be turned on, the driving frequency is continuously shifted from f1 to f2 so that the driving frequency of the switching elements is shifted to a frequency range higher than Fon.

2. The discharge lamp lighting circuit according to claim 1, wherein where a frequency positioned between f1 and f2 is represented as "fw", after the discharge lamp initiates to be turned on, a variation speed of the driving frequency changing from f1 to fw is different from a variation speed of the driving frequency changing from fw to f2.

3. The discharge lamp lighting circuit according to claim 2, wherein a value of fw is defined so that a relationship "f1<fw<Fon" is held between F1, fw and Fon.

4. The discharge lamp lighting circuit according to claim 2, wherein where the variation speed of the driving frequency changing from f1 to fw is represented as "Δf1*w*/Δt", the variation speed of the driving frequency changing from fw to f2 is represented as "Δfw2/Δt", and magnitude of the variation speeds are represented using an absolute value sign "||", a relationship "|Δf1*w*/Δt|>|Δfw2/Δt|" is held.

5. The discharge lamp lighting circuit according to claim 2, wherein a time period required for a shift from f1 to f2 is from 10 milliseconds to one second inclusive.

6. The discharge lamp lighting circuit according to claim 1, wherein a magnitude of the variation speed of the driving frequency becomes smaller as the driving frequency approaches f2.

7. The discharge lamp lighting circuit according to claim 1, wherein the control section includes a time constant circuit which changes the driving frequency from f1 to f2.

8. The discharge lamp lighting circuit according to claim 3, wherein where the variation speed of the driving frequency changing from f1 to fw is represented as "Δf1*w*/Δt", the variation speed of the driving frequency changing from fw to f2 is represented as "Δfw2/Δt", and magnitude of the variation speeds are represented using an absolute value sign "||", a relationship "|Δf1*w*/Δt|>|Δfw2/Δt|" is held.

9. The discharge lamp lighting circuit according to claim 3, wherein a time period required for a shift from f1 to f2 is from 10 milliseconds to one second inclusive.

10. The discharge lamp lighting circuit according to claim 4, wherein a time period required for a shift from f1 to f2 is from 10 milliseconds to one second inclusive.

11. The discharge lamp lighting circuit according to claim 8, wherein a time period required for a shift from f1 to f2 is from 10 milliseconds to one second inclusive.

12. The discharge lamp lighting circuit according to claim 2, wherein a magnitude of the variation speed of the driving frequency becomes smaller as the driving frequency approaches f2.

13. The discharge lamp lighting circuit according to claim 3, wherein a magnitude of the variation speed of the driving frequency becomes smaller as the driving frequency approaches f2.

14. The discharge lamp lighting circuit according to claim 4, wherein a magnitude of the variation speed of the driving frequency becomes smaller as the driving frequency approaches f2.

15. The discharge lamp lighting circuit according to claim 5, wherein a magnitude of the variation speed of the driving frequency becomes smaller as the driving frequency approaches f2.

16. The discharge lamp lighting circuit according to claim 2, wherein the control section includes a time constant circuit which changes the driving frequency from f1 to f2.

17. The discharge lamp lighting circuit according to claim 3, wherein the control section includes a time constant circuit which changes the driving frequency from f1 to f2.

18. The discharge lamp lighting circuit according to claim 4, wherein the control section includes a time constant circuit which changes the driving frequency from f1 to f2.

19. The discharge lamp lighting circuit according to claim 5, wherein the control section includes a time constant circuit which changes the driving frequency from f1 to f2.

20. The discharge lamp lighting circuit according to claim 6, wherein the control section includes a time constant circuit which changes the driving frequency from f1 to f2.

* * * * *